(12) United States Patent
Connelly

(10) Patent No.: US 6,606,821 B1
(45) Date of Patent: Aug. 19, 2003

(54) HORTICULTURAL DRAINAGE METHOD AND SYSTEM

(76) Inventor: Larry C. Connelly, P.O. Box 4517, Austin, TX (US) 78756

( * ) Notice: Subject to any disclaimer, the term of this patent is extended or adjusted under 35 U.S.C. 154(b) by 0 days.

(21) Appl. No.: 09/479,437

(22) Filed: Jan. 7, 2000

(51) Int. Cl.$^7$ ................................................ A01G 29/00
(52) U.S. Cl. ...................................... 47/48.5; 71/64.11
(58) Field of Search ............................ 47/64, 31, 65.6, 47/78, 80, 81, 48.5; 71/64.11, 64.13, 22

(56) References Cited

U.S. PATENT DOCUMENTS

| | | | | |
|---|---|---|---|---|
| 1,992,878 A | * | 2/1935 | Muller ........................... | 47/80 |
| 1,996,898 A | * | 4/1935 | Brandell ...................... | 47/65.6 |
| 4,051,625 A | * | 10/1977 | Sawyer ........................... | 47/14 |
| 5,181,951 A | | 1/1993 | Cosse, Jr. .................. | 71/64.11 |

FOREIGN PATENT DOCUMENTS

| | | | | |
|---|---|---|---|---|
| FR | 0165112 A1 | * | 12/1985 | ................. 71/64.11 |
| WO | WO-92/10445 | * | 6/1992 | ................. 71/64.11 |

OTHER PUBLICATIONS

Translation : of claims 4 and 6 from EP–0165112A1; from http://world.altavista.com/tr.*

* cited by examiner

Primary Examiner—Charles T. Jordan
Assistant Examiner—Francis T. Palo
(74) Attorney, Agent, or Firm—The Law Firm of H. Dale Langley, Jr., PC

(57) ABSTRACT

A method of draining moisture from a soil includes steps of providing a first surface in contact with the soil, wherein the first surface is permeable and non-absorbent; providing a plurality of granules in contact with the first surface, wherein the plurality of granules is permeable and non-absorbent; and providing a second surface in contact with the plurality of granules, wherein the second surface is permeable and non-absorbent. The method includes dispersing the moisture via the first surface, the granules, and the second surface, distributing the moisture via the first surface, the granules, and the second surface, and draining the moisture via the first surface, the granules, and the second surface. The dispersing, distibuting and draining are caused by gravitational and capillary effect. The method is performed by a potting insert. The potting insert is located in a potting container, below soil in the container.

13 Claims, 3 Drawing Sheets

HORTICULTURAL DRAINAGE METHOD AND SYSTEM

BACKGROUND OF THE INVENTION

The invention relates generally to horticultural and gardening aids and, more particularly, to inserts for potted plants and the like to disperse, distribute and drain moisture in horticultural and botanical applications.

Vitality concerns are presented when plants are contained in impermeable containers or otherwise surrounded with impermeable boundaries. The roots of plants cannot be subjected to constant moisture, or the roots will tend to rot or otherwise acquire disease that is harmful to the plant. Of course, water is necessary for plants to sustain growth. It is, therefore, desirable that soils and bases for planting allow retention of moisture in soil, with dispersion, distribution and drainage of excess moisture. The dispersion, distribution and drainage is typically accomplished through multiple granules or pellets of rock, gravel or other loosely packed porous materials maintained below soil for the plant. These loosely packed porous materials tend to disperse moisture as it contacts the individual granules or pellets across the surface thereof and also directs the moisture away from the granules or pellets, because of capillary and gravity physics, respectively. The close, touching proximity of the individual granules or pellets also results in distribution of moisture as it is dispersed, because the capillary and gravity effects of the moisture as it encounters adjacent (e.g., side by side, below, and above) granules and pellets. Moreover, the loosely packed, but touching, nature of the granules and pellets allows moisture to drain through and out of contact with plant roots in the soil. In this manner, capillary action and gravity allow successful dispersion, distribution and drainage of water from soil, through the porous material, and away from plant roots.

It has been common to prepare plants, for example, in pots or other containers, either to maintain the plants therein as herbal or floral arrangements, to germinate from seeds or grow from seedlings the plants for later transplant, and for other purposes. These pots or other containers typically are formed of materials that are impermeable to moisture. One or more openings are often included in a base of such containers in order that excess moisture contained within the containers will have a route of exit from the containers. In preparation for potting using such containers, the porous materials previously described, such as gravel, rocks or other materials, are typically first placed in the bottom of the container. Soil is then layered atop the porous materials, and the plant, seedling or seed is planted in the soil.

Problems have been presented by these conventional planting practices. For example, the soil layered over the porous materials tends to lodge between the individual granules of rock or gravel, restricting porosity of the materials. Over time as moisture is added to the soil, the moisture carries soil particles further and in greater quantities into remaining space between the granules. Eventually, the porous materials become much less porous, even to the point of becoming rather impermeable to moisture. The moisture can cause root rot or other bad effects to the plants.

Other problems are presented as well by the conventional planting practices. The practices require that supplies of porous materials, such as the gravel, rocks or other materials, be available in sufficient quantities. As can be appreciated, finding, or if not readily available supplying and storing, the porous materials requires added effort and often spillage mess. Time is wasted, and ease and efficiency are reduced, if loose porous materials are used.

Certain approaches have been attempted for resolving the foregoing problems by containing porous materials within individual packets, for placement in planting containers, for example, as shown U.S. Pat. No. 5,181,951, issued Jan. 26, 1993, to Cosse. According to the '951 patent, fertilizer and gravel are containable within an envelope that is placed in the base of a planting container. The envelope serves a water retention purpose, in addition to containing the gravel and fertilizer. This water retention purpose of the envelope has been found to be counterproductive, however, because moisture is retained and maintained stagnant at the roots of plants in the container. As previously mentioned, such moisture can cause root rot and other deleterious effects. It would, therefore, be a significant improvement and advance in the art and technology to provide a potting insert, for placement in a potting container, that overcomes these problems and provides other advantages.

SUMMARY OF THE INVENTION

An embodiment of the invention is a planting insert. The insert includes a first weaved, non-absorbent sheet, a second weaved, non-absorbent sheet, a plurality of non-absorbent individual granules located between the first sheet and the second sheet, and a seam joining the first sheet and the second.sheet to enclose and contain the granules between the first sheet and the second sheet.

Another embodiment of the invention is an insert for potted plants. The insert includes a first side and a second side. The first side and the second side are joined to form an enclosed pocket. Granules are contained within the enclosed pocket.

Yet another embodiment of the invention is a method of planting. The method includes providing a container, placing an insert comprising a first side and a second side joined to form an enclosed pocket, and enclosing granules within the enclosed pocket, inside the container, and depositing soil in the container atop the insert. Another embodiment of the invention is a method of draining moisture from a soil. The method includes providing a first surface in contact with the soil, wherein the first surface is permeable and non-absorbent, providing a plurality of granules in contact with the first surface, wherein the plurality of granules is permeable and non-absorbent, and providing a second surface in contact with the plurality of granules, wherein the second surface is permeable and non-absorbent.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
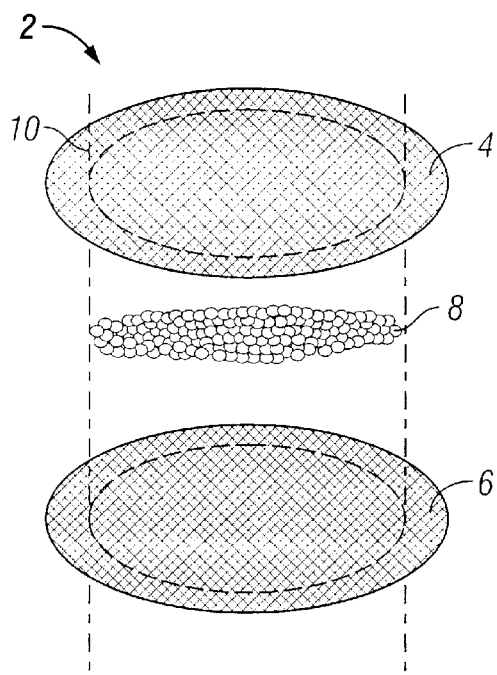
FIG. 1 is an exploded, perspective view of a potting insert according to embodiments of the present invention.

Referring to FIG. 1, a potting insert 2 includes a first envelope side 4, a second envelope side 6, and a plurality of individual granules 8. The first and second envelope sides 4, 6 are generally circular in shape and are a material that does not absorb, but repels, moisture. The material is, for example, a polymer, a plastic, or some other similar material. The material of the first and second envelope sides 4, 6 can be biodegradable, if desired for the application. A rather loose weave for the first and second envelope sides 4, 6 provides a suitable material because of the desired dispersion, distribution and drainage aspects of the first and second envelope sides 4, 6, as hereinafter described. The first and second envelope sides 4, 6 have approximately equal diameter, and that diameter is at least about equivalent to a diameter of a base of a potting container (not shown). Generally, it is appropriate that the first and second envelope sides 4, 6 are of somewhat greater diameter than the base of the potting container, on the order of one or more inches greater diameter. The excess diameter of the first and second envelope sides 4, 6 provides for room to join the two sides 4, 6, enclosing the granules 8, and still have some excess to edge up to a wall of the potting container.

The individual granules 8 are located and maintained between the first and second envelope sides 4, 6. The individual granules 8 are generally spherical in shape and are a material that does not absorb moisture, such as plastic, rock, or other similar material. Dimensions of the individual granules 8 can vary widely, however, a diameter of individual granules 8 if they are generally spherical will be on the order of at least about 1/16" to as large as about an inch or more. The material of the individual granules 8 must not be biodegradable for most applications. The number of individual granules 8 of the insert 2 can vary according to a diameter of the insert 2 and a size and shape of the granules 8, however, a number of granules 8 to form at least one layer, and usually up to several layers, of granules 8 between the first and second envelope sides 4, 6 is desirable.

The potting insert 2 is manufactured by shaping the first and second envelope sides 4,6 as desired. The individual granules 8 are then placed atop a central portion of the second envelope side 6, as the second envelope side 6 is maintained generally planar atop a flat surface. The first envelope side 4 is then placed atop the granules 8, so that it approximately matches with the second envelope side 6. The first and second envelope sides 4,6 are then joined, for example, by sewing, gluing, tacking or other method. The first and second envelope sides 4, 6 are joined at a periphery of the sides 4, 6, outlining the granules 8 within that periphery. For example, the sides 4,6 can be joined in a circular path along the periphery of the sides 4,6 and about ¼" to 2" from the periphery. By joining the sides 4,6 a short distance from the outer periphery, the loose weave material of the sides 4,6 does not unravel so that the side disjoin. The mechanism and location for joining the first and second envelope sides 4,6 can be varied, as desired, to account for the particular weave material of the sides 4,6, the size, shape, and number of the granules 8, the desired shape of the insert 8 to correspond to the plant container, and other factors.

Figure 2:
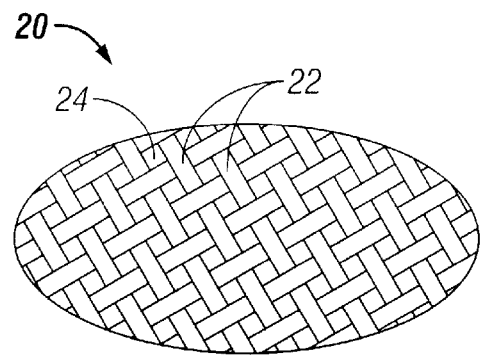
FIG. 2 is an enlarged perspective view of a weave material of a envelope side of the potting insert according to embodiments of the present invention.

Referring to FIG. 2, a weave portion 20 is enlarged and taken from either the first or second envelope side 4, 6. The weave portion 20 includes criss-crossing individual strands 22. These individual strands are patterned according to known textile practices, for example, over/under of adjacent strands and other suitable designs. An important characteristic of the design of the weave portion 20 is that the individual strands 22 are patterned so that there are interstitial spaces 24 between the strands 22. The interstitial spaces 24 are smaller than the size of the granules 8 and are of sufficient size for moisture droplets to pass through the spaces 24. Capillary effects of the particular moisture are important in this regard to the size of the interstitial spaces 24, because the capillary effects of the moisture, in light of the size of the spaces 24, must not prevent passage through the interstitial spaces 24 of the moisture.

Figure 3:
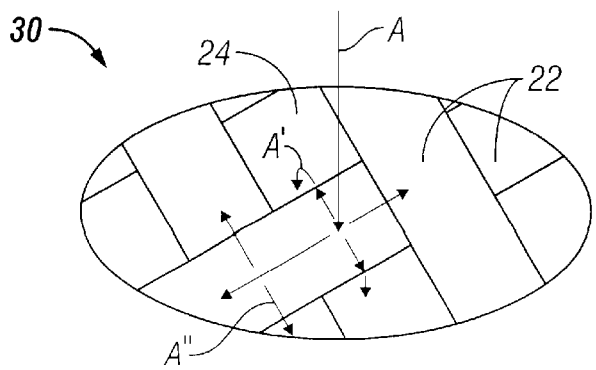
FIG. 3 is a further enlarged perspective view of the weave material of an envelope side, showing moisture flows of dispersion, distribution and drainage caused by capillary and gravity forces.

Referring to FIG. 3, the weave portion 20 of FIG. 2 is further enlarged to illustrate moisture capillary and drainage effects with the pattern and weave of the first and second envelope sides 4,6. A criss-cross weave 30 includes the individual strands 22. Between the individual strands 22, the interstitial spaces 24 remain. Moisture A, for example, in the form of a water droplet, is directed downward (in FIG. 3) by gravity, onto the weave 30. The moisture A impacts the weave 30, then is dispersed. The dispersion occurs because of gravitational and capillary forces. For example, capillary forces and gravity cause some of the moisture A to spread across a width of the individual strand 22 and then fall through the interstitial space 24 in the direction of the moisture A'. Other of the moisture A remains atop the individual strand 22 and travels along the strand 22 in a distributive manner, because of capillary forces, which may be coupled with gravity forces. The travel of the moisture A along the strand in such distributive manner is indicated by the moisture A". The moisture A" will eventually also be distributed to and reach the interstitial space 24 and travel through the space 24 because of gravitational force.

Referring to FIGS. 1 and 3, in conjunction, in operation of the potting insert 2, once the moisture A impacts the first envelope side 4 and travels as just described, the moisture A impacts the individual granules 8 of the insert 2. The moisture A passes over the surface of certain of the individual granules 8, because of capillary and gravity forces, further distributing the moisture A. Gravity forces drive the moisture A downward from the granules 8 onto the second envelope side 6. At the second envelope side 6, the moisture A again, due to gravity and capillary effects, is distributed as has been described, travelling along the individual strands 22 of the side 6 and ultimately through the interstitial spaces 24. As the moisture A exits through the interstitial spaces 24, the moisture A is drained from the potting insert 2. As so drained, the moisture A is removed upon impacting the first envelope side 4, passing through the insert 2, and then exiting through the second envelope side 6.

Figure 4:
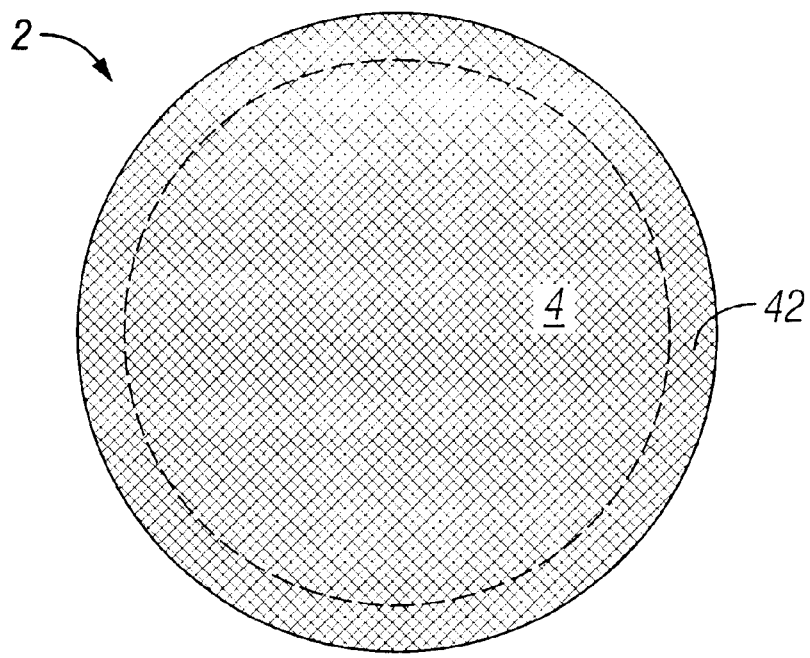
FIG. 4 is a top view of the potting insert according to embodiments of the present invention.

Referring to FIG. 4, the potting insert 2 of FIG. 1 includes the first envelope side 4 in a top view. The first envelope side 4 covers the second envelope side 6 (not shown). Between the first and second, envelope sides 4,6, the plurality of individual granules 8 (not shown) are contained in a pocket formed between the sides 4, 6. A seam 42 substantially outlines the granules 8 and joins the first and second envelope sides 4,6. The seam 42 is sewn, tacked, melted, or otherwise formed to join the sides 4,6 in a circular outline around the granules 8.

Figure 5:
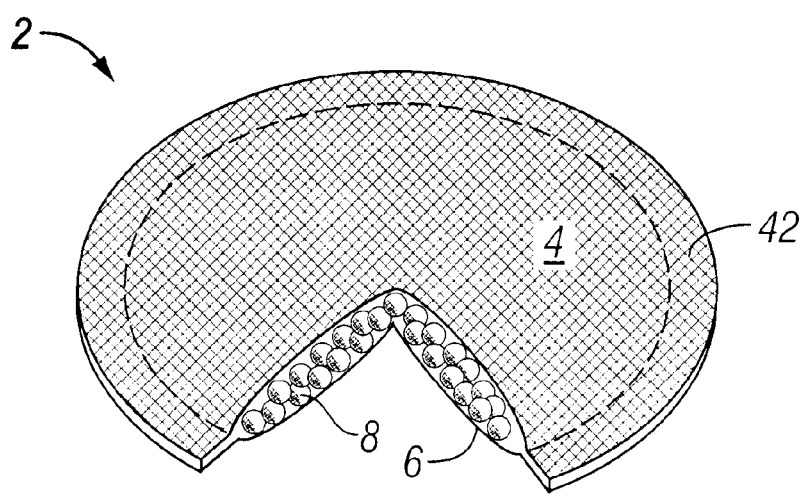
FIG. 5 is a perspective, cut away view of the potting insert, showing contents within the envelope of the insert, according to embodiments of the present invention.

Referring to FIG. 5, the potting insert 2 of FIG. 1 in a perspective, cut away view, shows the relative positional relationship of the first envelope side 4, the second envelope side 6, the individual granules 8, and the seam 42 surrounding the granules 8 and joining the sides 4, 6. As can be seen from FIG. 5, the seam 42 forms a pocket between the first envelope side 4 and the second envelope side 6. This pocket contains the individual granules 8 in a layered arrangement.

The seam 42 is circular and is located a short distance from the periphery of the sides 4,6.

Figure 6:
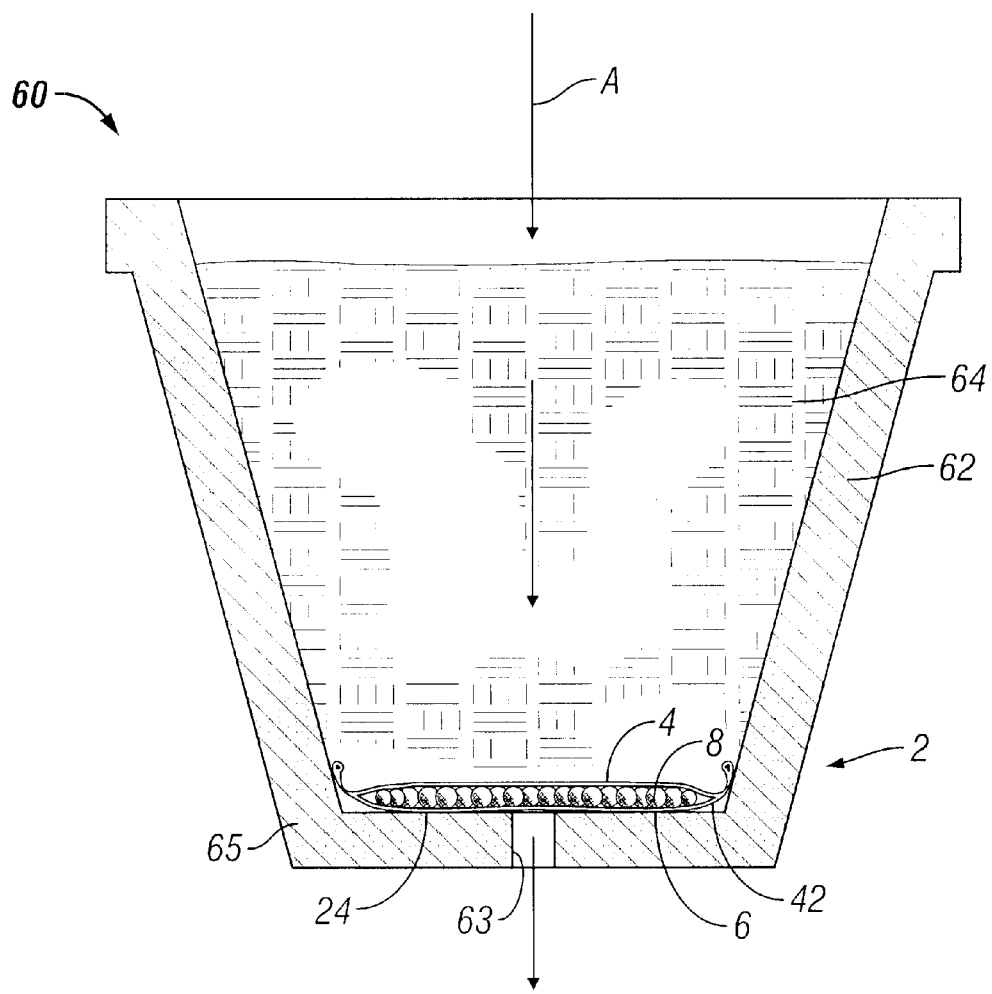
FIG. 6 is a cross-sectional side view of the potting insert in use in a plant container, according to embodiments of the present invention.

Referring to FIG. 6, a potting arrangement 60 includes a container 62 in which is located the potting insert 2. The container 62 has a moisture exit hole 63 in a base 65 of the container. The potting insert 2 is adjacent the base 65 at the hole 63. The potting insert 2 includes the first envelope side 4 and the second envelope side 6 joined at the seam 42, and containing the granules 8 between the sides 4, 6 within the seam 42. Atop the potting insert 2 within the container 62 is soil 64 or other planting material. The soil 64 touches the potting insert 2 at the first envelope side 4, but does not penetrate the insert 2.

In operation, moisture A delivered to the soil 64 migrates through the soil 64 to touch the first envelope side 4. This moisture A is dispersed, distributed and drained via the potting insert 2, as previously described. In particular, the moisture A is dispersed and distributed by the first envelope side 4. The moisture A then contacts the granules 8 and is further dispersed and distributed across the surfaces of the granules 8. After the moisture A proceeds through the granules 8, the moisture A contacts the second envelope side 6 where it is further dispersed and distributed and drains by exiting the insert 2 through the interstitial spaces 24 of the second envelope side 6. After passing through the insert 2, the moisture drains from the container 62 through the exit hole 63.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A planting insert, comprises:
   a first weaved, non-absorbent sheet;
   a second weaved, non-absorbent sheet;
   a plurality of non-absorbent individual substantially smooth spherical granules located between the first sheet and the second sheet; and
   a seam joining the first sheet and the second sheet to enclose and contain the granules between the first sheet and the second sheet;
   wherein the granules have substantially smooth spherical surfaces encouraging fluids dispersion and runoff and evaporation over the surfaces, avoiding water retention.

2. The insert of claim 1, wherein the first weaved, non-absorbent sheet and the second weave, non-absorbent sheet each disperse, distribute and drain moisture applied to the sheets.

3. The insert of claim 1, wherein the granules are selected from the group consisting of: rock, gravel, beads, and pellets.

4. An insert for potted plants, comprising:
   a first side;
   a second side;
   wherein the first side and the second side are joined to form an enclosed pocket; and
   substantially smooth spherical granules are contained within the enclosed pocket;
   wherein the granules have substantially smooth spherical surfaces encouraging fluids dispersion and runoff and evaporation over the surfaces, avoiding water retention.

5. The insert of claim 4, wherein the insert is pervious.

6. The insert of claim 4, wherein the first side and the second side are a woven fabric that is non-absorbent.

7. The insert of claim 4, wherein the granules are solid, generally spherically shaped forms and are closely packed with interstitial spaces therebetween.

8. A method of planting, comprising the steps of:
   providing a container;
   placing an insert comprising a first side and a second side joined to form an enclosed pocket, and enclosing substantially smooth spherical granules within the enclosed pocket, inside the container;
   depositing soil in the container atop the insert;
   dispersing fluids via the substantially smooth spherical surfaces of the granules;
   running off fluids via the substantially smooth spherical surfaces of the granules; and
   evaporating fluids via the substantially smooth spherical surfaces of the granules.

9. The method of claim 8, wherein the first side and the second side are each a weaved, permeable, non-absorbent material.

10. The method of claim 8, wherein the granules are solid, non-absorbent material and are permeable when packed in close relationship.

11. A method of draining moisture from a soil, comprising the steps of:
   providing a first surface in contact with the soil, wherein the first surface is permeable and non-absorbent;
   providing a plurality of substantially smooth spherical granules in contact with the first surface, wherein the plurality of granules is permeable and non-absorbent; and
   providing a second surface in contact with the plurality of granules, wherein the second surface is permeable and non-absorbent;
   wherein the granules have substantially smooth spherical surfaces encouraging fluids dispersion and runoff and evaporation over the surfaces, avoiding water retention.

12. The method of claim 11, further comprising the steps of:
   dispersing the moisture via the first surface, the granules, and the second surface;
   distributing the moisture via the first surface, the granules, and the second surface; and
   draining the moisture via the first surface; the granules, and the second surface.

13. The method of claim 12, wherein the dispersing, distributing and draining are caused by gravitational and capillary effects.

* * * * *